United States Patent [19]

Murakami et al.

[11] Patent Number: 4,640,471
[45] Date of Patent: Feb. 3, 1987

[54] CLUTCH RELEASING AND BRAKING MECHANISM FOR FISHING REEL

[75] Inventors: Hideo Murakami; Takehiro Kobayashi, both of Hiroshima, Japan

[73] Assignee: Ryobi Ltd., Hiroshima, Japan

[21] Appl. No.: 641,546

[22] Filed: Aug. 17, 1984

[30] Foreign Application Priority Data

Aug. 18, 1983 [JP] Japan .............. 58-128237[U]
Jun. 1, 1984 [JP] Japan .............. 59-82236[U]

[51] Int. Cl.$^4$ ............ A01K 89/015; A01K 89/02
[52] U.S. Cl. ................... 242/84.53; 242/212; 242/221
[58] Field of Search ............ 242/84.2 A, 84.21 A, 242/84.5 R, 84.51 R, 84.53, 211, 212, 213, 216, 217, 218, 219, 220, 221

[56] References Cited

U.S. PATENT DOCUMENTS

| | | | |
|---|---|---|---|
| 683,940 | 10/1901 | Howe | 242/84.53 |
| 2,536,583 | 1/1951 | Tank | 242/216 |
| 3,258,218 | 6/1966 | Stalder | 242/220 |
| 4,014,422 | 3/1977 | Morshita | 242/212 |
| 4,520,971 | 6/1985 | Nagata | 242/220 |

FOREIGN PATENT DOCUMENTS

| | | | |
|---|---|---|---|
| 469385 | 5/1914 | France | 242/84.53 |
| 58-4176 | 1/1983 | Japan . | |

Primary Examiner—Billy S. Taylor
Attorney, Agent, or Firm—Sughrue, Mion, Zinn, Macpeak, and Seas

[57] ABSTRACT

A clutch releasing and braking mechanism for a below-the-rod double-bearing type fishing reel having a simplified and compact construction. An operating lever of the reel is pivotally mounted on a frame member of the reel, and a cam portion, rotatable with the operating lever, is provided at the pivot point of the operating lever. The cam portion engages with and operates a braking mechanism. A clutch operating lever, which may be formed as a separate lever and connected to the operating lever via a rotary shaft or as a rearward extension of the operating lever, has a clutch-operating pin at its outward end. The clutch-operating pin engages a second clutch lever, the latter having a pin which directly operates the clutch mechanism.

7 Claims, 9 Drawing Figures

CLUTCH RELEASING AND BRAKING MECHANISM FOR FISHING REEL

BACKGROUND OF THE INVENTION

The present invention relates to a below-the-rod double-bearing type fishing reel. More particularly, the invention relates to a clutch releasing and braking mechanism for selectively braking the spool of the reel and releasing a clutch of the reel at the start of a casting operation by operating a lever pivotally mounted on an upper portion of the reel.

Fishing reels of the below-the-rod doublebearing type are of course well known. An example of such a reel is disclosed in published Japanese Utility Model Application No. 58-4176, laid open on Jan. 11, 1983. In the reel described in this document, a release lever, pivotally mounted on the case of the reel, has a forwardly extending portion which the operator can actuate to release the clutch and to brake the spool of the reel. First and second operating members, which effect the braking and clutch moving operations, protrude rearwardly from the forwardly extending portion. This construction is, however, disadvantageous in that the first and second members protruding from the rear end of the second portion of the operating lever require a significant amount of space to accommodate them, thereby making the overall size of the reel larger than desired. Also, the two protruding members can interface with one another, thereby giving rise to the possibility of failure. Further, during casting operations, if the reverse rotational speed of the spool exceeds the speed at which the fishing line is played out evenly, the line may well become entangled on the spool.

Accordingly, it is a primary object of the present invention to provide a below-the-rod double-bearing type fishing reel in which the above-mentioned drawbacks are eliminated.

SUMMARY OF THE INVENTION

In accordance with the above and other objects, the invention provides a below-the-rod double-bearing type fishing reel in which an operating lever is pivotally mounted on an upper part of a case of the reel, and a shaft to which the operating lever is fixed and which rotates with the operating lever has fixed thereto both a cam portion and a clutch lever. Rotation of the operating lever causes the cam portion to rotate against a spring-biased brake shoe mechanism which controls the braking of the reel. Also, rotation of the operating lever causes rotation of the clutch lever which, through a pin engaging with a second rotatable clutch lever, controls the operational state of a clutch mechanism.

DESCRIPTION OF THE PREFERRED EMBODIMENTS

Figure 1:
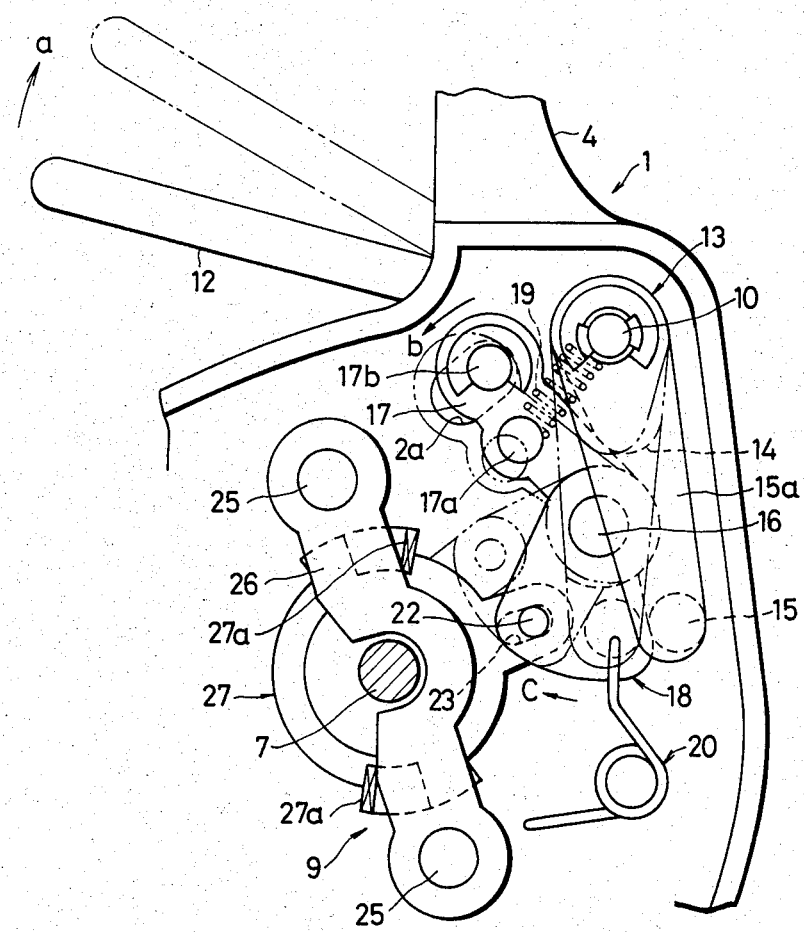
FIG. 1 is a plan view showing a first embodiment of a clutch releasing and braking mechanism constructed in accordance with the present invention.
Figure 2:
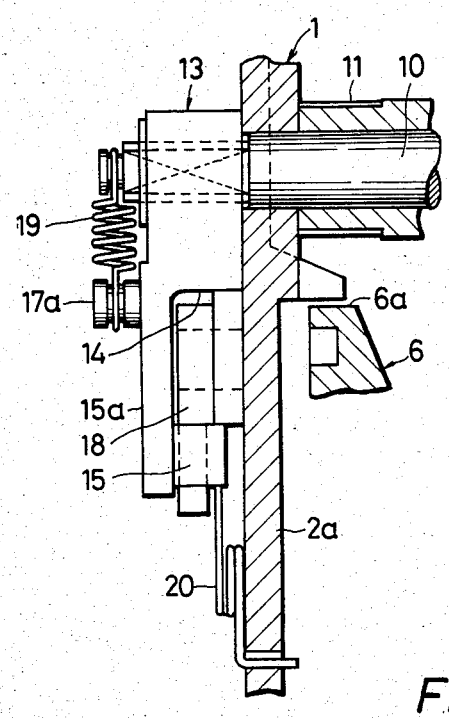
FIGS. 2 and 3 are cross-sectional views showing portions of the reel of FIG. 1.

Referring first to FIGS. 1 through 6 of the accompanying drawings, a first embodiment of a below-the-rod double-bearing type fishing reel constructed in accordance with the present invention will be described. As seen in FIG. 1, a reel body 1 includes two opposed end plates 2a and 2b, fixedly supported and spaced apart by supporting rods 3. A shank 4 extends above the end plates 2a and 2b, and flares into a mounting foot 4a for attachment to the rod (not shown). Covers 5 and 5' cover the outer sides of the end plates 2a and 2b and define spaces in which the operating mechanism of the reel is contained. A fishing line spool 6 is rotatably mounted between the end plates 2a and 2b via a spool shaft 7.

Figure 5:
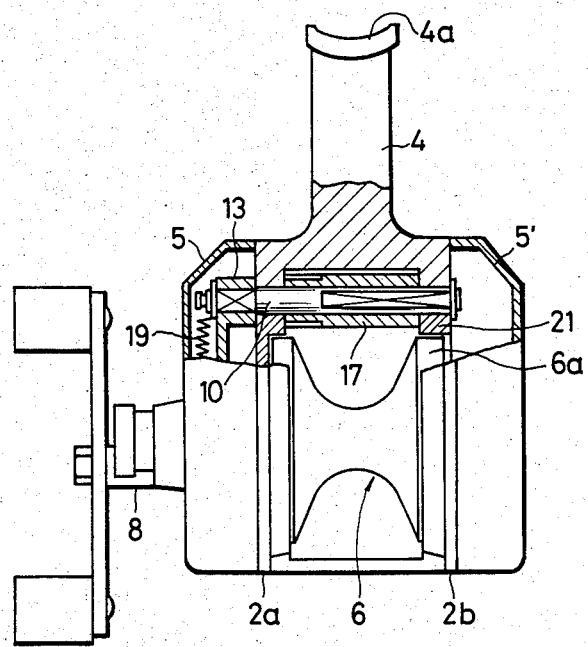
Figure 6:
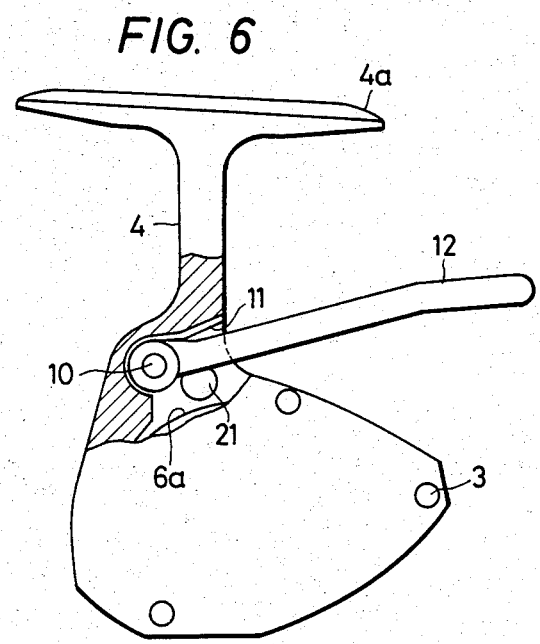

As seen in FIG. 5, the shaft 8 of a winding handle is rotatably mounted to the cover 5. In the space defined between the cover 5 and the end plates 2a, a clutch mechanism, as shown in FIG. 1, is provided for selectively rotatably coupling the shaft 8 to the shaft 7 of the spool 6. A conventional drag mechanism may be provided between the shafts 7 and 8. Further, a reverse rotation preventing mechanism may be provided within the space defined between the cover 5 and the end plate 2a.

An operating lever 12 is fixed to a shaft 10, and the shaft 10 is rotatably mounted between the end plates 2a and 2b. A spring 11 is provided for rotatably biasing the operating lever 12 opposite to the direction a indicated in FIG. 1. The operating lever 12 is movable in the direction a by the operator.

A first clutch lever is fixedly mounted to one end of the shaft 10 inside of the space defined between the cover 5 and the end plate 2a. The clutch lever 13 has on one side thereof a cam portion 14. The clutch lever 13 also includes an arm portion 15a. At the end of the arm portion 15a opposite the shaft 10 is attached a pin 15, the latter extending parallel to the shaft 10.

A brake lever 17 is rotatably mounted on a shaft 16, as is a second clutch lever 18. The shaft 16 is fixed to the end plate 2a. The brake lever 17 is urged in the direction opposite the direction b indicated in FIG. 1 by a coil-type brake spring 19. The brake spring 19 is connected between a pin 17a, fixed to approximately the center portion of the brake lever 17, and the shaft 10. The brake spring 19 thus urges one side of the brake lever 17 into engagement with the cam portion 14 of the first clutch lever 13 with the shaft 16 acting as the fulcrum.

One end of a dead-point spring 20 is engaged with the free end of the second clutch lever 18, while the other end of the dead-point spring 20 is engaged with the end plate 2a. The spring 20 thus urges the second clutch lever 18 into abutment with the pin 15. Accordingly, movement of the operating lever 12 in the direction a causes the brake lever 17 and second clutch lever 18 to move in the directions b and c against the forces of the springs 19 and 20, respectively.

Figure 3:
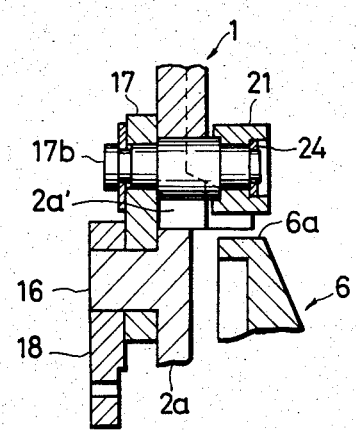
Figure 4:
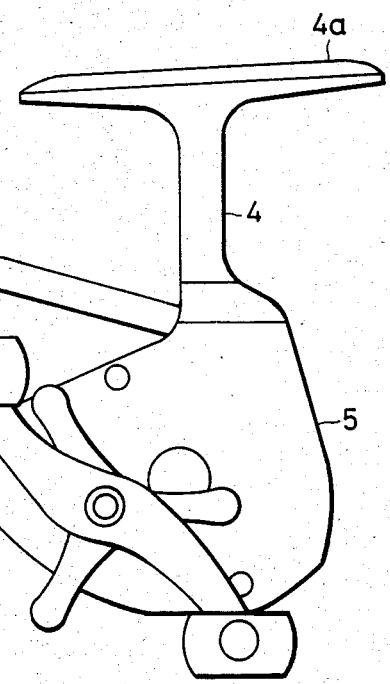
FIGS. 4 to 6 are, respectively, a side view from the left side of the reel of FIG. 1, a front view, partially in cross section, of the reel of FIG. 1, and a side view, partially in cross section, from the right side of the reel of FIG. 1.

A brake shoe 21 is provided at the movable end of the brake lever 17, positioned so as to contact with a flange 6a of the spool 6 to brake the spool 6. The brake shoe 21 is fixedly mounted, as shown in FIG. 3, with a washer 24 to an inner end of a shaft 17b which is fixed to the movable end of the brake lever 17. The shaft 17b passes through an elongated hole 2a' formed in the end plate 2a.

As shown in FIG. 1, the clutch mechanism 9 includes an operating plate 26 and a clutch plate 27. The operating plate 26 is journaled on the spool shaft 7. The operating plate 26 is slidably engaged at opposite ends with fixed shafts 25, and a spring (not shown) for biasing the operating plate 26 inwardly as viewed in FIG. 1 is engaged with the shafts 25. The clutch plate 27 is provided with two cam portions 26 which, when the clutch plate 27 is rotated counterclockwise as viewed in FIG. 1, engage with the operating plate 26 to move it against the force of the spring engaged with the shafts 25. A pin 22, fixed to one end of the second clutch lever 18, is engaged with an arm of the clutch plate 27 via an elongated hole 23 formed in the arm. The operating plate 26 is slidable axially to engage a gear of a drag mechanism (not shown) with a pinion (not shown). The operating plate 26 is moved axially by the cam portions 27a when the clutch plate 27 is rotated couterclockwise by operation of the second clutch lever 18 upon the operator pulling the operating lever 12 in the direction a. This action releases the interconnection between the spool shaft 7 and the handle shaft 8. On the other hand, when the operating lever 12 is released, the reverse movement of the clutch plate 27 causes the operating plate 26 to move in the opposite direction, thereby rotatably linking the spool shaft 7 and the handle shaft 8.

More specifically, when the operating lever 12 is at the position indicated by a solid line in FIG. 1, the levers 13, 17 and 18 are at positions also indicated by solid lines due to the biasing actions of the springs 19 and 20. In this state, the brake shoe 21 is held separated from the flange 6a of the spool 6 and the clutch mechanism 9 is in the engaged state.

Then, when the lever 12 is pulled in the direction a, the first clutch lever 13 is rotated in the clockwise direction, thereby rotating the brake lever 17 and the clutch 18 counterclockwise and clockwise, respectively, with the shaft 16 acting as a fulcrum. This action simultaneously releases the clutch mechanism 9 and causes the brake shoe 21 to move into contact with the flange 6a of the spool 6, thereby halting the rotation of the spool 6. When the operator releases his finger from the lever 12, allowing lever 12 to return to the position indicated by the solid line, the first clutch lever 13 is restored to the position indicated by the solid line, thereby restoring the brake lever 17 due to the force of the spring 19. Also, the brake shoe 21 is separated from the flange 6a of the spool 6, releasing the braking state and allowing the spool 6 to rotate to allow the fishing line to be played out. It is of course possible to brake the spool by operating the lever 12 in the direction a during the casting operation to prevent backlash of the line.

The construction of the below-the-rod double-bearing type reel of the first embodiment described above is advantageous over the prior art construction with respect to the clutch releasing and braking mechanism. Specifically, in the above-described embodiment, the construction of the operating lever is simpler than that employed in the conventional reel since all elements other than the lever 12 and brake shoe 21 are received inside of the case of the reel. The overall size of the reel is made more compact, and backlash of the fishing line during the casting operation can easily be prevented.

Figure 7:
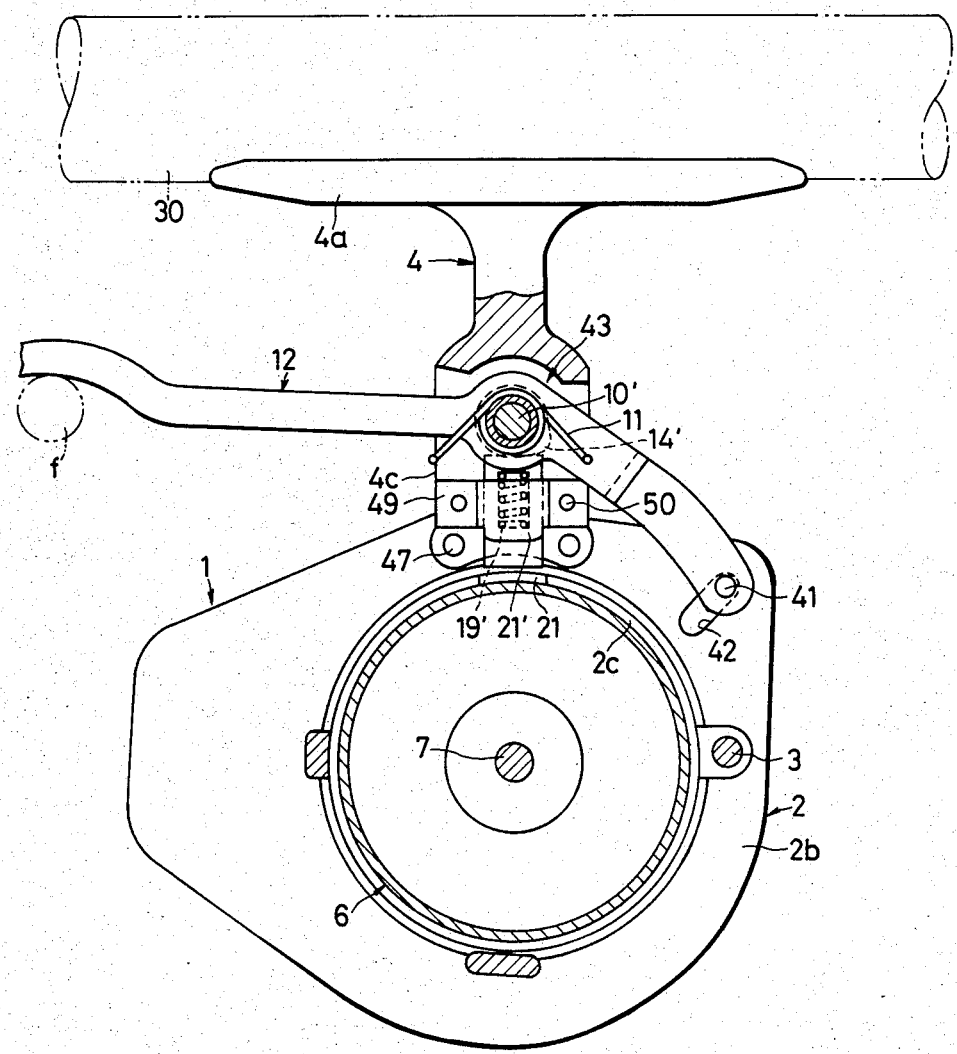
FIG. 7 is a side view, partially in cross section, of a second embodiment of a below-the-rod double-bearing type fishing reel of the present invention.
Figure 8:
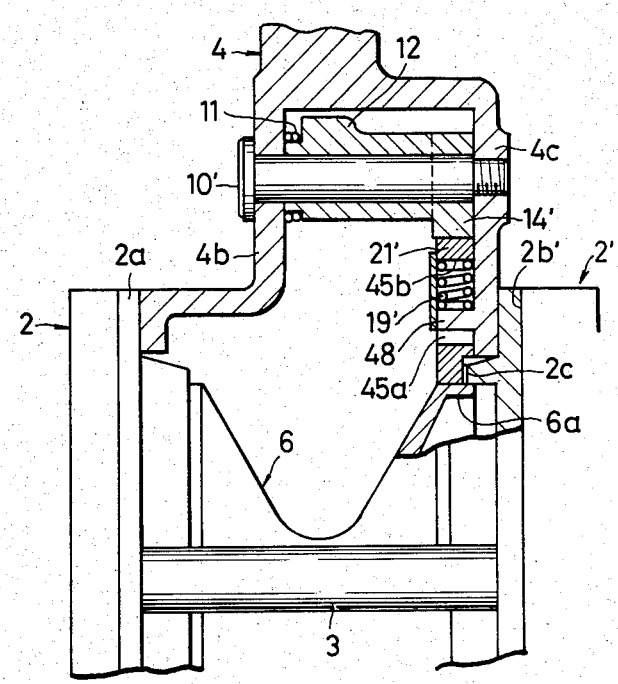
FIG. 8 is a front view, partially in cross section, of a portion of the reel of FIG. 7.
Figure 9:
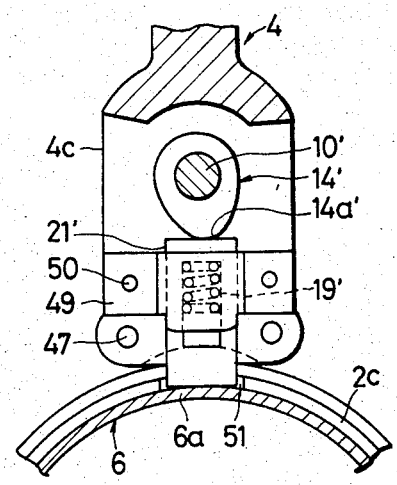
FIG. 9 is a cross-sectional view of another portion of the reel of FIG. 7.

Referring now to FIGS. 7 through 9, a second embodiment of the invention will now be described. In FIGS. 7 through 9, components identical or similar to corresponding components in the embodiment of FIGS. 1 through 6 are identified by like reference numerals, and further detailed descriptions thereof are omitted.

As shown in FIG. 7, a reel body 1 is connected to the shank 4 with screws 47. As in the first-described embodiment, the shank 4 flares into a mounting foot 4a used to attach the reel to a rod 30. In this embodiment, the operating lever 12 is mounted upon a shaft 10' extending between leg portions 4b and 4c provided in the lower portion of the shank 4. The operating lever 12 is rotationally biased counterclockwise in FIG. 7 by a spring 11 wound around the shaft 10'. A clutch pin 41 is provided at an end of a portion of the lever 12 which protrudes rearwardly from the juncture point with the shaft 10'. The pin 41 is slidably inserted into an elongated hole 42 provided in the end plate 2b of a side frame 2'.

A cam portion 14' is formed integrally with a central portion 43 of the operating lever 12. A brake shoe 21' is disposed below the central portion 43 of the operating lever 12, between the bottom of the cam portion 14' and the flange 6a of the spool 6. The brake shoe 21 is movable in the vertical direction of FIG. 7 and is urged upwardly by a spring 19'.

The cam 14' is in the position shown in FIG. 7 when the operating lever 12 is in the illustrated released state. However, when the operating lever 12 is pulled upwardly (rotated in the clockwise direction in FIG. 7), the cam portion 14 is rotated so as to depress the brake shoe 21' against the force of the spring 19', thereby moving the brake shoe 21' into abutment with the flange 6a of the spool 6, and thereby braking rotational movement of the spool 6. The braking mode is illustrated in FIG. 9.

If desired, the cam 14' can be formed integrally with the operating lever 12 by deforming a part of the central portion 43 of the operating lever 12, or it may be formed by uniting a second member to the operating lever. Any desired construction of the cam portion 14' may be employed so long as the cam portion 14' is rotatable together with the operating lever 12.

The brake shoe 21', which has a generally rectangular configuration, has an elongated through-hole 45a at the center thereof as shown in FIG. 8. A guide piece 48 is provided at the inner surface of the leg portion 4c and fitted into the elongated hole 45a to guide the movement of the brake shoe 21' in the vertical direction. The spring 19a is disposed between a top end 45b of the elongated hole 45a. The guide piece 48 is prevented from disengaging from the elongated hole 45 by a holding plate 49, the latter being attached to the leg portion 4c by pins 50. The bottom end of the brake shoe 21' passes through a recess 51 provided in a flange portion 2c of the end plate 2b.

The pin 41 performs the function of the pin 15 in the first-described embodiment. Therefore, the arm portion 15a of the lever 13 employed in the first-described embodiment can be omitted. Otherwise, the clutch mechanism in this second embodiment may be the same as in the first-described embodiment. Of course, there is no need to provide the brake lever 17, etc., used to perform the braking function in the first-described embodiment.

In operation, when the operating lever 12 is pulled upwardly (turned counterclockwise in the drawing) by the finger f of the operator, the rotation of the operating lever 12 causes the clutch pin 41 at the rear end of the operating lever 12 to move downwardly along the elongated hole 42, thereby releasing the clutch mechanism. Simultaneously, the cam portion 14' rotates to push the brake shoe 21' downwardly by the top portion 14a' of the cam portion 14'. This action forces the brake shoe 21' into engagement with the periphery 6a of the spool 6, thereby braking the rotational movement of the spool 6. When the operating lever 12 is released, the operating lever 12 turns in the counterclockwise direction in FIG. 7, thereby moving the clutch pin 41 outwardly and thus engaging the clutch. Also, rotation of the cam portion 14' causes the brake shoe 21' to disengage from the periphery 6a of the spool 6. Accordingly, the mode illustrated in FIG. 7 is restored.

In the second preferred embodiment described above, because the brake shoe 21' is provided at a position under the pivoted central portion of the operating lever 12 while the clutch pin 41 is provided at the end of a rearward extension from the central portion of the operating lever 12, there is no danger whatsoever of any interference between the two operating members. Also, the brake shoe 21' will always be pushed down smoothly and surely by the rotation of the cam portion 14' so that the braking and clutch operating movements are always performed smoothly.

This completes the description of the preferred embodiments of the invention. Although preferred embodiments have been described, it is believed that numerous modifications and alterations thereto would be apparent to one of ordinary skill in the art without departing from the spirit and scope of the invention.

We claim:

1. A below-the-rod double-bearing type fishing reel comprising:

a reel housing;

a reel frame within said housing;

an operating lever extending forwardly and externally of said housing and rotatably mounted within said housing on an upper portion of said frame;

a cam portion within said housing, said cam portion rotatable with said operating lever around a pivot point of said operating lever;

a spool rotatably mounted on said frame;

brake means for reciprocatingly moving into and out of engagement with said spool to brake and release, respectively, said spool; said brake means being positioned within said housing and in proximity to said cam portion such that rotation of said cam portion in a first direction actuates said brake means to cause it to brake said spool;

a first clutch lever rotatable with said operating lever and joined to said operating lever at said pivot point;

a first pin within said housing and affixed to an end of said first clutch lever opposite said pivot point; and clutch means within said housing and operable by movement of said first pin;

wherein said operating lever is fixed to a shaft which constitutes said pivot point, said shaft being rotatably mounted on said frame in said housing, and wherein said first clutch lever is fixed to said shaft for rotation with said operating lever;

wherein said clutch means comprises a second clutch lever rotatably mounted at one end and having a free end positioned to abut said first pin, a second pin fixed to said free end of said second clutch lever, a rotatably mounted clutch plate having an arm having an elongated hole therein in which said second pin is inserted, an operating plate disposed in abutment with cam portions of said clutch plate, said operating plate being moved in the axial direction of said spool upon rotation of said clutch plate caused by rotation of said second clutch lever, and spring means for biasing said operating plate in an axial direction;

wherein said brake means comprises a brake lever having one end rotatably mounted about a fixed point in said housing, a brake shoe coupled to a free end of said brake lever, and a spring for rotatably urging said brake lever into engagement with said cam portion; and wherein said second clutch lever and said brake lever are rotatably mounted about the same point.

2. The fishing reel of claim 1, further comprising a dead-point spring having one end fixed to said frame and another end attached to said second clutch lever for urging said second clutch lever into engagement with said first pin.

3. The fishing reel of claim 1, wherein said frame comprises two spaced-apart plates.

4. The fishing reel of claim 1, wherein said first clutch lever is integral with said operating lever and comprises an extension of said operating lever extending rearwardly of a central pivoted portion of said operating lever.

5. The fishing reel of claim 4, wherein said brake means comprises a brake shoe positioned below the pivot point of said operating lever, between said pivot point and a periphery of said reel.

6. The fishing reel of claim 4, wherein said central portion of said operating lever is pivotally mounted between leg portions of a mounting member of said reel, and wherein said brake shoe is slidably mounted in said mounting member.

7. The fishing reel of claim 6, wherein said first pin extends through an elongated hole formed in said frame.

* * * * *